Oct. 18, 1938.  R. G. BERRY  2,133,843
TESTING DEVICE FOR SHOCK ABSORBERS
Filed Nov. 11, 1936  2 Sheets-Sheet 1
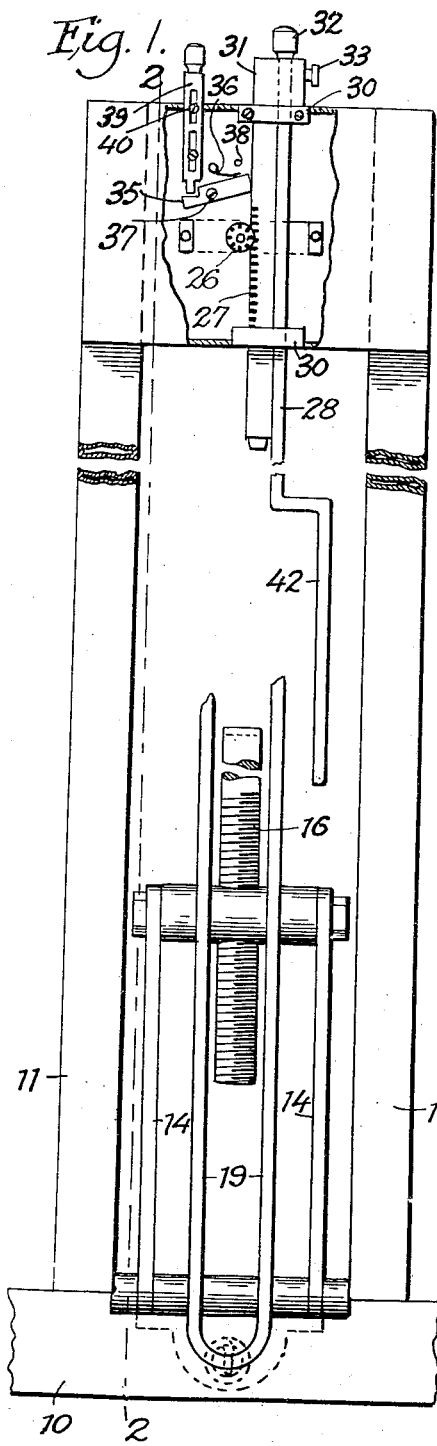
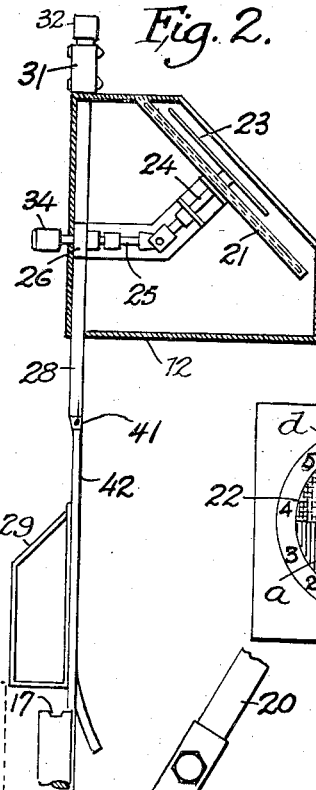
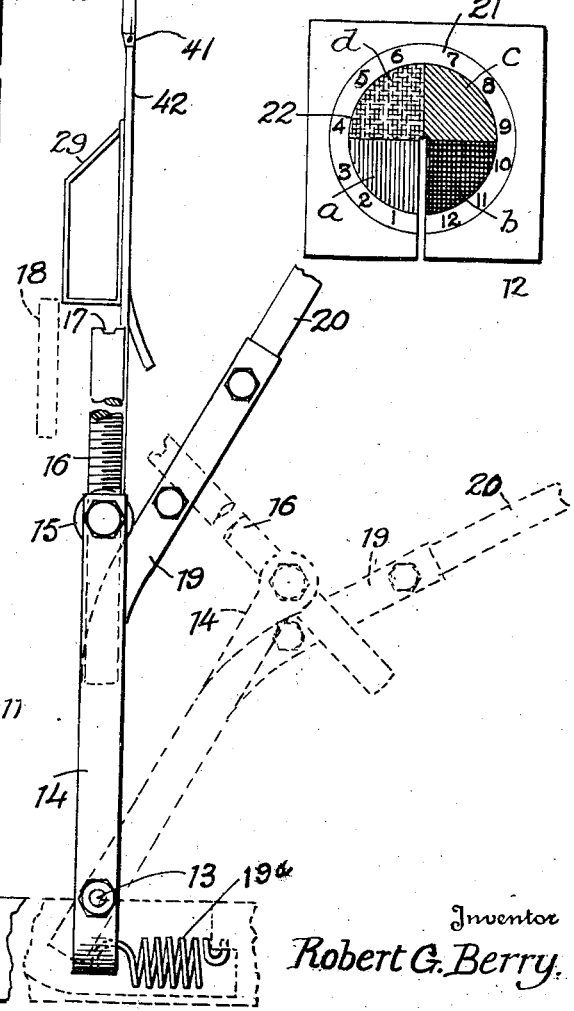
Inventor
Robert G. Berry
By John W. Farley
Attorney Oct. 18, 1938.  R. G. BERRY  2,133,843
TESTING DEVICE FOR SHOCK ABSORBERS
Filed Nov. 11, 1936  2 Sheets-Sheet 2
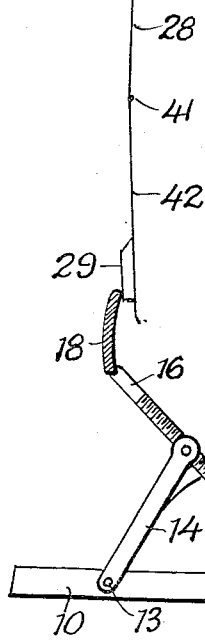
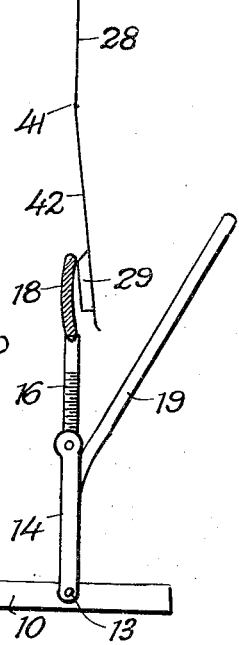
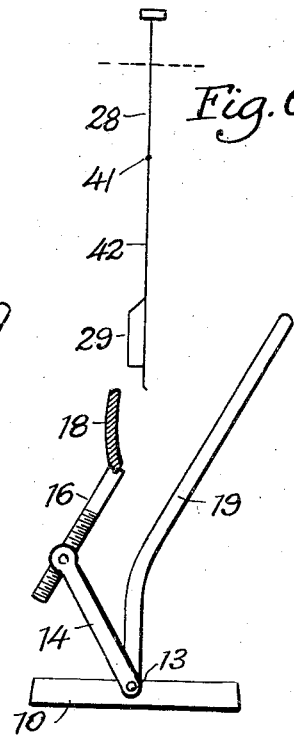
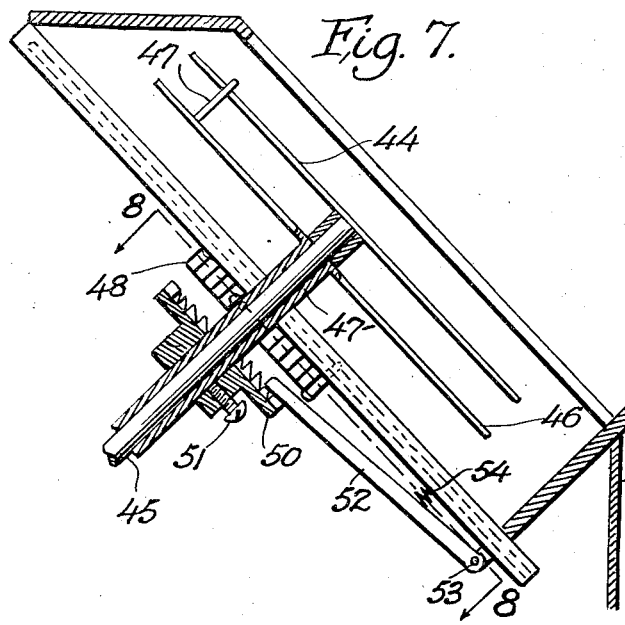
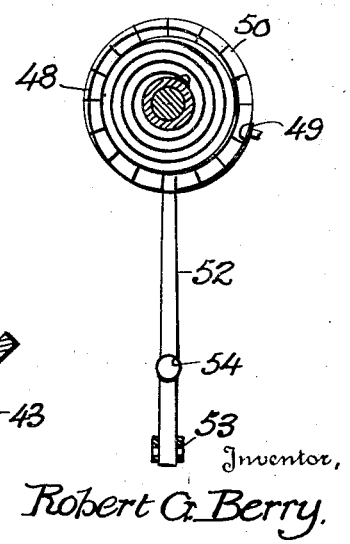
Inventor,
Robert G. Berry.
By John W. Farley
Attorney Patented Oct. 18, 1938

2,133,843

UNITED STATES PATENT OFFICE 2,133,843

TESTING DEVICE FOR SHOCK ABSORBERS

Robert G. Berry, Memphis, Tenn.

Application November 11, 1936, Serial No. 110,399

11 Claims. (Cl. 73—51)

My invention relates to a testing device for shock absorbers of motor vehicles, and it is an object of the same to provide a simple and inexpensive device whereby the rebound of shock absorbers may be readily tested, this device being also applicable for testing the efficiency of vehicle springs.

Another object of the invention is to provide a device of this character with an indicator which shall hold its position after an operation as long as desired in order that an accurate reading may be taken thereof.

Another object of the invention is to provide a device of this character with convenient means for lifting a vehicle body and then suddenly dropping it so that it will rebound in a natural manner as upon passing an inequality in the road.

Referring to the drawings, which are made a part of this application, and in which similar characters represent similar parts;

Figure 1 is a rear elevation of my device with parts omitted for convenience of showing;

Fig. 2 is a section on line 2—2 of Fig. 1;

Fig. 3 is a plan of a dial forming part of the indicating means;

Figs. 4, 5 and 6, diagrammatic illustrations showing steps in the operation of the device;

Fig. 7 a vertical section of a modified indicating means; and

Fig. 8 a section on line 8—8 of Fig. 7.

In the drawings, reference character 10 indicates a base frame forming part of the device, said frame having uprights 11 at the upper end of which there is provided a casing 12 for the indicating means.

A pivot 13 on the frame carries a pair of supporting members 14, upon which is mounted a pivot 15 for another supporting member 16. The member 16 is threaded to the pivotal member 15 for convenient adjustment with reference thereto and its upper end is flattened and provided with a notch at 17 for convenient engagement with a part of the car, such as a bumper 18. A bent lever 19 is pivoted coaxially with supporting members 14 and 13. In the form here shown, lever 19 has a U-shaped lower portion and a handle 20 secured thereto and it will be seen from the illustration in Fig. 2 that this bent lever is adapted to engage the member 15 at its bent portion and to exert a toggle action upon members 14 and 16 when member 16 engages a part to be raised, so that the toggle members 14 and 16 will be moved from the dotted line position toward the aligned position shown in full lines, all without danger of injury to the operator's hands, since the upper portion of the lever is at some distance from the part being lifted and from the frame members 11, etc. A spring 19a holds the lever 19 in upright position.

The indicating means at the upper end of the device are substantially enclosed in the casing 12 and they comprise a support 21 for a dial such as indicated at 22 in Fig. 3. It will be understood that dials with different characteristics will be needed for cars of different types and thus a suitable face can readily be provided for the indicating means, according to the type of car being tested. In the dial illustrated the indicating face is divided into four portions of different color; portion a being red, b being black, c being green, and d being amber.

The indicating means also includes a finger 23 on a shaft 24 connected by a universal joint to a shaft 25 carrying a pinion 26 meshing with a rack 27 secured to or carried by an upright rod 28. The rod 28 preferably has an abutment 29 at or near its lower end for engagement by a portion of the car, such as the bumper 18, and the rod and rack are guided on the casing as by straps 30. In the embodiment here shown, the rod passes through a block 31 on the rack and is adjustable with reference thereto, a head 32 being provided on the rod for moving it manually up or down with reference to the block and rack, and a set screw 33 serving to secure the parts in relative adjusted position. A hand-wheel 34 on shaft 25 may be used for turning the finger 23 back to normal position, the rack and the rod 28 being also moved at this time, or the user may press down on the head 32 for this purpose.

When the rod and rack have been raised to operate the indicating means, they are held in raised position by a pawl 35 pivoted at 37 and arranged to engage the teeth of the rack 27 and forced into engagement therewith by means of a spring 36. A stop 38 is provided on the casing to limit the counterclockwise movement of the pawls as the rack is elevated. For releasing the pawls a slide 39 is provided, this slide being guided for vertical movement by such means as screws 40 and being arranged to engage the tails of the pawls to release them from the rack.

The operation of the device is illustrated in Figs. 4, 5 and 6, wherein it will be noted that there is a joint at 41 in the vertically movable rod so that the lower portion 42 can swing with reference to the upper portion 28. When the device has been positioned properly with reference to a portion of the vehicle, such as a bumper 18, the rod 28 will be adjusted if necessary, so as to bring the abutment 29 to the position illustrated in Fig. 4, i. e.; with the lower part of the abutment just slightly below the upper edge of the bumper. At this time the lower part 42 of the rod is swung forward to a limited extent as shown in Figs. 4 and 5. Now the toggle mechanism is positioned as shown in Fig. 4, the lever 19 is operated to straighten the toggle so as to lift the vehicle body to a predetermined extent (e. g., five inches) and then the lever is moved farther counterclockwise so that the toggle can break suddenly as indicated in Fig. 6, dropping the car body and permitting the abutment 29 to swing into the path of movement of the bumper. When the abutment 29 comes into contact with the bumper 18 the upward movement and the rebound resulting from the upward movement of the car causes the part 42 to operate the registering mechanism.

If the shock absorber is in proper condition the finger will move, for example, into the green segment of the dial, indicating that the shock absorber is in good condition. If the resistance of the shock absorber is weak, it will move only into the amber section; if there is no resistance, it will move into the red sector; and if the resistance is high, it will move into the black sector. Preferably numerals are arranged about the margin of the dial on the part marked 21 in Fig. 3 so as to afford a more definite means for identifying the amount of resistance. While this device is intended primarily for measuring the resistance in shock absorbers, it may also be used to determine the condition of the springs of a vehicle not equipped with shock absorbing means, and it is intended for testing in connection with any spring-supported portion of a vehicle or the like, such as a truck chassis with or without a load thereon.

Figs. 7 and 8 show a modified form of indicating means, consisting of a casing 43 with a finger 44 on a shaft 45, which shaft may be operated as before. A secondary finger 46 is mounted on a sleeve 47' concentric with shaft 45 and this finger is arranged to be dragged with finger 44 by a nib 47 mounted on finger 46 and engaging the under side of finger 44. A coil spring 48 is secured at one end to the sleeve 47' and at the other end to the casing at 49. This spring is arranged so as normally to hold finger 46 in zero position, and when finger 44 is turned it drags 46 with it against the action of spring 48. A ratchet 50 is fixed to the sleeve 47' by means of a set screw 51 and a pawl 52 pivoted at 53 is held in engagement with ratchet 50 by a spring 54. It will thus be seen that finger 46 will be held in the registering position regardless of the return of finger 44 to neutral position, so that a reading may be taken subsequently if desired. Upon lifting pawl 52 out of engagement with the ratchet the spring 48 will return the secondary finger 46 to neutral position.

It will be seen that by testing with this invention shock absorbers known to be in good condition an operator can soon determine a standard of correct resistance. A shock absorber which is in poor condition does not act effectively to control the rebound, and therefore the indicating means is moved farther than when the indicating means is acted on by an efficiently acting shock absorber, the amount of rebound increasing as the efficiency of the shock absorber decreases. The finger normally points toward the bottom of the dial and therefore the black segment indicates high resistance (which may be too high); the green, good condition; the amber, fair; and the red, little or no resistance by the shock absorber. All tests of shock absorbers and springs can be made with this device without removing any of them from the car.

The adjusting means for the toggle is important, as this makes it possible to adjust the device quickly for lifting the sprung weight of the vehicle body or other analogous part a given distance by a single stroke of the lever, regardless of the height of such part above the ground, and regardless of the height above ground of whatever part is to be engaged by the lifting member.

By the provision of interchangeable dials, different dials may be provided which are suitable for different situations, each color in a dial indicating the tolerance limits for a certain condition of spring or shock absorber.

It will be obvious to those skilled in the art that my device may be modified in various respects, all without departing from the spirit of the invention; therefore I do not limit myself to what is shown in the drawings nor to what is described in the specification, but only as required by the state of the prior art.

Having thus fully described my said invention what I claim is:

1. A testing device for vehicles having a spring supported part, said device comprising means for lifting and dropping such part, a graduated member, a finger movable upon rebound of such part for indicating on said graduated member the amount of rebound, and means for holding said finger at the limit of the movement so imparted to it.

2. A device as in claim 1, said graduated member being in the form of a dial coacting with the finger, and said finger being mounted for rotation, and said device including a support adapted to receive and hold in fixed position interchangeable faces for said dial.

3. A testing device for vehicles having a spring supported part, comprising indicating means supported independently of such part, means whereby such part may be lifted and dropped, and operating means for said indicating means including an abutment adapted to be positioned for engagement by said part and for actuation thereby upon rebound of said part.

4. A testing device for a vehicle having a spring supported part, said device comprising a supporting frame, indicating means thereon, means on said frame whereby such vehicle part may be lifted and then dropped, and operating means for said indicating means including an abutment independent of the vehicle adapted to be positioned for actuation upon rebound of said part.

5. A testing device for vehicles having a spring supported part, said device comprising a supporting frame, indicating means thereon, including a dial, a finger coacting therewith, a vertically movable rod connected to said finger, an abutment on said rod, and toggle mechanism on said frame arranged for lifting such vehicle part and then dropping it suddenly, whereby upon rebound of said part a portion thereof may contact said abutment to raise said rod to actuate said finger.

6. A device as in claim 5, including means for holding said rod in raised position.

7. A device as in claim 5, including means for holding said rod in raised position, and manual means for releasing said holding means.

8. A testing device for vehicles having a spring supported part comprising indicating means, means for supporting said means independently of said vehicle, a casing for said indicating means, a vertically movable rod passing through said casing and connected to actuate said indicating means, said rod including means for engagement by a portion of said vehicle part, upon rebound thereof, means for lifting and dropping said vehicle part, means for holding said rod in raised position, and manual means for releasing said holding means.

9. An implement for testing spring-supported vehicles comprising in combination a base, a pair of uprights on said base, indicating means carried by said uprights and comprising a vertically slidable rod, a dial, a rotary indicator for said dial, means mounted on said base between said uprights for engaging a spring-supported vehicle part to lift and drop the same, means in connection with said slidable rod positioned to be raised by said vehicle part upon rebound thereof, means for rotating said indicator upon the raising of said rod, and means for preventing return movement of said indicator.

10. An implement as in claim 9, said lifting and dropping means including toggle members, and a hand-operated lever constructed and arranged to effect both the lifting and the dropping of said vehicle part by continuous unidirectional movement.

11. An implement for testing spring-supported vehicles, said implement comprising a base, fixed uprights on said base, a casing connecting the upper ends of said uprights, a vertically movable rod mounted in said casing, an abutment on said rod laterally offset with respect to said uprights, means connected to said rod for indicating the extent of its vertical movement, a toggle member pivoted on said base between said fixed uprights, a toggle member pivoted to the first-named toggle member and provided with means at its free end for engagement with a spring-supported vehicle part adjacent to said abutment, and a lever pivoted to the base adjacent to the pivot of said first-named toggle member, said lever being constructed and arranged for engagement with the pivot joint of the toggle for first straightening and then breaking the toggle by unidirectional movement of said lever.

ROBERT G. BERRY.